United States Patent
Hagiuda

(10) Patent No.: US 7,206,091 B2
(45) Date of Patent: Apr. 17, 2007

(54) NETWORK PRINTING DEVICE, AND METHOD AND CONTROL PROGRAM IN DEVICE THEREOF

(75) Inventor: Tadashi Hagiuda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 398 days.

(21) Appl. No.: 10/986,008

(22) Filed: Nov. 12, 2004

(65) Prior Publication Data

US 2005/0105130 A1 May 19, 2005

(30) Foreign Application Priority Data

Nov. 14, 2003 (JP) ............... 2003-385165

(51) Int. Cl.
*G06F 3/12* (2006.01)
*G06K 1/00* (2006.01)

(52) U.S. Cl. .................... 358/1.15; 358/1.13

(58) Field of Classification Search ............... 358/1.15, 358/1.13, 1.14, 1.16, 1.17, 1.18, 1.1, 1.6, 358/407, 468; 709/245, 238, 220; 370/254
See application file for complete search history.

(56) References Cited

U.S. PATENT DOCUMENTS 7,009,941 B1* 3/2006 Uchino .................. 370/254

2004/0122974 A1* 6/2004 Murakami ............... 709/245
2006/0072156 A1* 4/2006 Shima ..................... 358/1.15

FOREIGN PATENT DOCUMENTS

| JP | 11-39165 | 2/1999 |
| JP | 11-68765 | 3/1999 |
| JP | 11-112514 | 4/1999 |
| JP | 2002-244829 | 8/2002 |
| JP | 2003-167696 | 6/2003 |

* cited by examiner

*Primary Examiner*—Dov Popovici
(74) *Attorney, Agent, or Firm*—Fitzpatrick, Cella, Harper & Scinto

(57) ABSTRACT

In controlling a network printer, a driver program of the printer connected through the network is installed. A first network group identifier step acquires a group identifier of the network according to the installation or a network group identifier based on the group identifier. An identifier of the printer and the network group identifier are stored in association with each other. A printing request is performed for requesting a printer connected through the network, which is the same as or different from the printer of which the driver program is installed, to perform a printing process. A second network group identifier step acquires, in accordance with the printing request, a group identifier of the network to which the user is connected or a network group identifier.

27 Claims, 7 Drawing Sheets

WARNING MESSAGE

PRINTER SELECTION SCREEN 11000000.10101000.00000001.00010100
11111111.11111111.11111111.00000000

NETWORK PRINTING DEVICE, AND METHOD AND CONTROL PROGRAM IN DEVICE THEREOF

BACKGROUND OF THE INVENTION

1. Field of the Invention

The present invention generally relates to a control of a network printing.

2. Related Background Art

In recent years, offices have been rapidly networked, and various office equipment including a printer, a facsimile and the like have been connected mutually to a computer by a local area network (LAN), thereby making it possible to realize seamless data transmission and reception.

In the meantime, a mobile terminal represented by a notebook PC (personal computer) has made further progress in miniaturization and power saving, and has been enabled to connect with a network so as to perform transmission and reception of various data and electronic mails, while moving on the work area.

Under such circumstances, a printing process performed heretofore to a network printer from a desktop PC installed at a fixed location has come to change in such a way as to be connected with the network in the various work areas while the notebook PC is carried, thereby the printing process has been executed from the connected network.

Further, network control system for installing driver software are used in conventional network environment.

However, in the conventional network environment, when the connection is made to the network of the destination of relocation and the printing process is executed while the notebook PC is carried to move on the work area, there has been a problem that a printer set at a remote region is erroneously instructed to perform the printing process. In addition, there has been a problem that, even when a most suitable printer is already installed at every work area, in case a printer installed at another work area is selected as a default printer, the user has to select a printer suitable for the current work area by himself and perform outputting at the executing time of the printing process.

An aspect of the present invention is to prevent an erroneous output from being made on a printer installed at a remote region when a portable PC is used while moving on the work area and performing the printing process from the network of the destination of relocation.

SUMMARY OF THE INVENTION

The first aspect of the present invention is characterized by comprising: an installing step for installing a driver program of a printer connected through a network; a first network group identifier acquiring step for acquiring a group identifier of the network according to the installing step or a network group identifier based on the installing step; a storing step for storing the identifier of the printer and the network group identifier mutually associated; a printing request step for requesting printing in a printer connected to the network same as or different from the printer; and a second network group identifier acquiring step for acquiring a group identifier of the network to which the user is connected according to the printing request or a network group identifier based on the printing request.

Further, the second aspect of the present invention is characterized by comprising: installing means for installing a printer driver program connected through a network; first network group identifier acquiring means for acquiring a group identifier of a network according to the installing means or a network group identifier based on the installing means; storing means for storing the identifier of the printer and the network group identifier mutually associated; printing request means for requesting printing in a printer connected to the network same as or different from the printer; and second network group identifier acquiring means for acquiring a group identifier of the network to which the user is connected according to the printing request or a network group identifier based on the printing request.

Further, the program of the present invention is a program for allowing the step of the network printer control method to be executed by a computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate the embodiment of the invention and, together with the description, serve to explain the principles of the invention.

DETAILED DESCRIPTION OF THE PREFERRED EMBODIMENTS

The embodiment of the present invention will now be described in detail in accordance with the accompanying drawings.

Figures 7, 8:
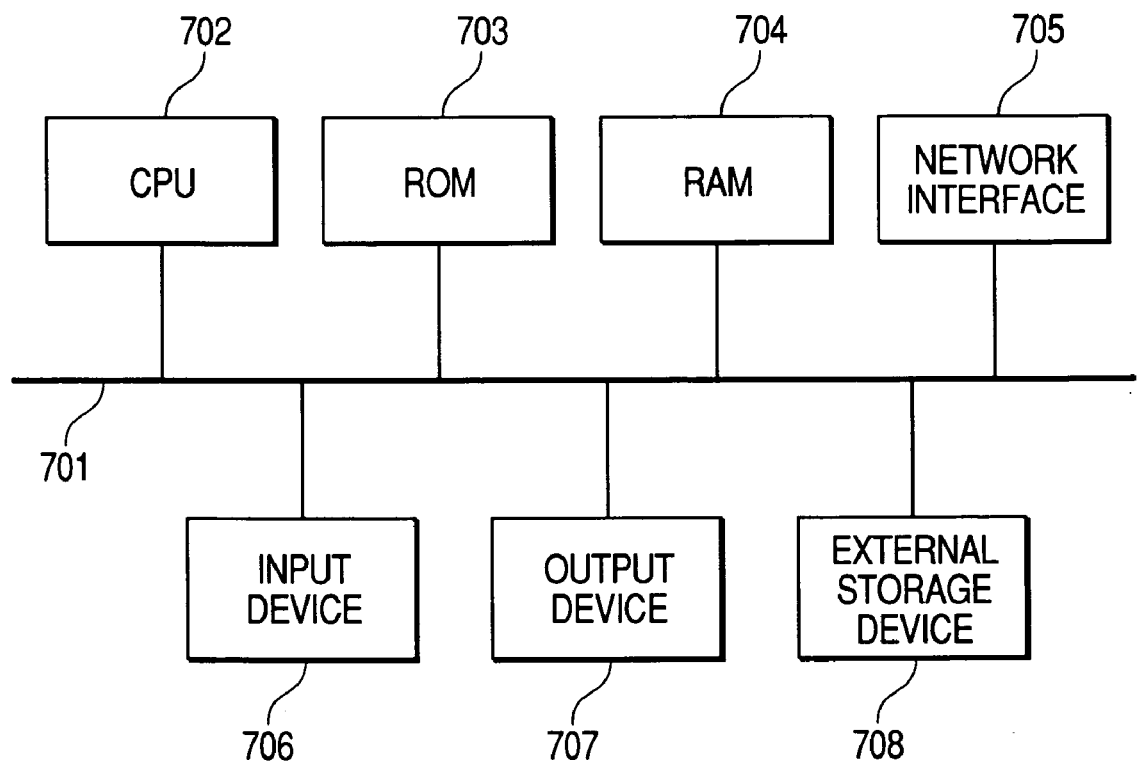
FIG. 7 is a block diagram showing an example of a hardware configuration of a notebook PC.
FIG. 8 is a view showing examples of an IP address and a subnet mask.

FIG. 8 is a view showing examples of an IP address and a subnet mask.

A logical product of the IP address and the subnet mask is as follows:

11000000.10101000.00000001.00000000

A network ID is 192.168.1.0.

Further, LAN 1100 is connected to printers 1101,1102, and 1103, and LAN 1200 is connected to printers 1201 and 1202, and LAN 1300 is connected to printers 1301 and 1302.

Further, LANs 1100, 1200 and 1300 are coupled by routers 1001, 1002 and 1003, respectively, and the routers 1002 and 1003 are connected through an Internet/Intranet 1010.

Here, in a notebook PC 1000, the printers 1101,1102 and 1103 are installed in a work area A, and the printers 1201 and 1202 are installed in a work area B, and the printers 1301 and 1302 are installed in a work area C.

A notebook PC 1000A shows the case where the notebook PC 1000 is connected to a network in the network area A, and displays a warning message to indicate that a selected printer is possibly located at a remote region when the notebook PC 1000A selects the printers 1201, 1202, 1301 and 1302 installed at other work areas at the printing time.

A notebook PC 1000B shows the case where the notebook PC 1000 is connected to the network in the work area B, and displays a warning message to indicate that a selected printer is possibly located at a remote region when the notebook PC 1000B selects the printers 1101, 1102, 1103, 1301 and 1302 installed at other work areas at the printing time.

A notebook PC 1000C shows the case where the notebook PC 1000 is connected to the network in the work area C, and displays a warning message to indicate that a selected printer is possibly located at a remote region when the notebook PC 1000C selects the printers 1101, 1102, 1103, 1201 and 1202 installed at other work areas at the printing time.

The above described operations will be specifically described below subsequent to FIG. 2.

Figure 2:
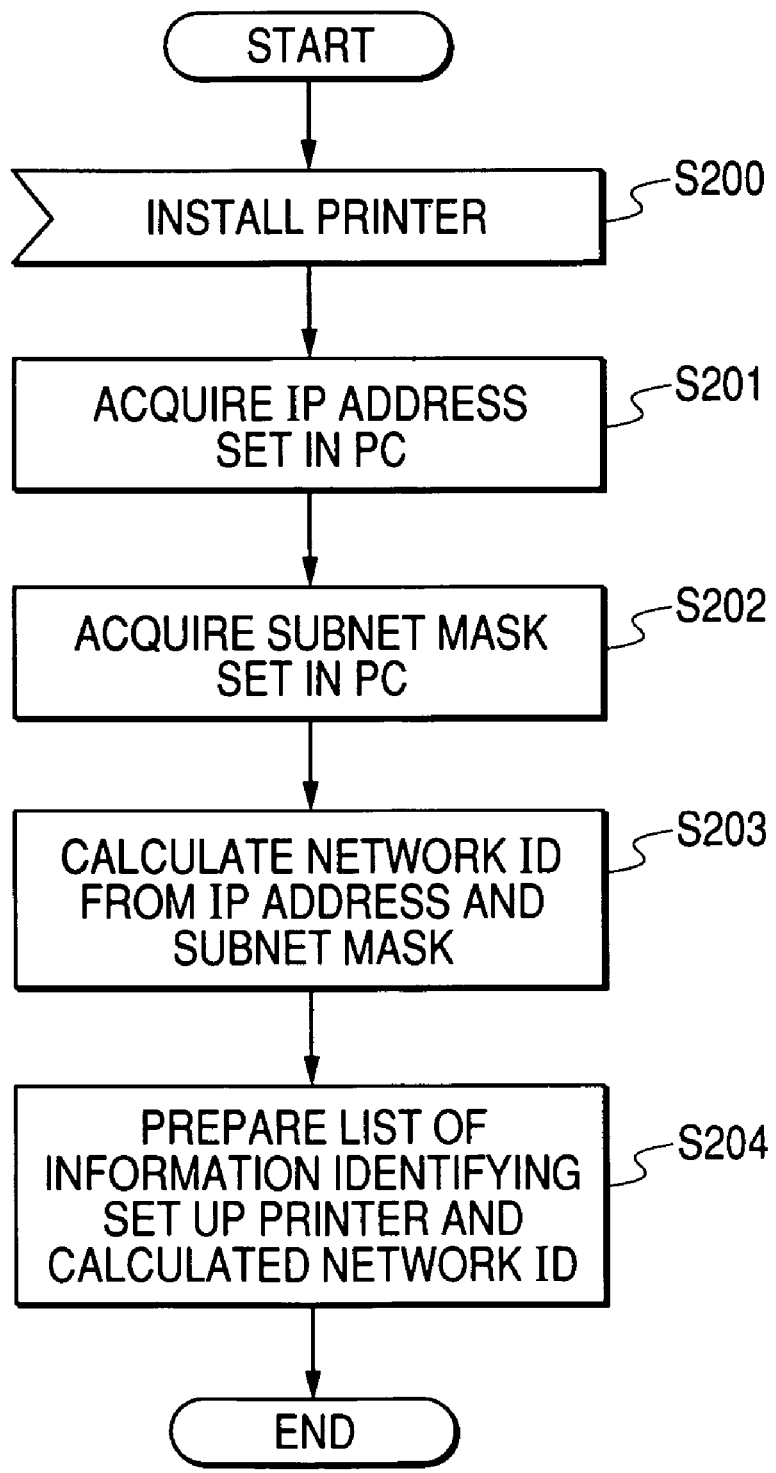
FIG. 2 is a flowchart showing an operation at the installing time of a printer by the network printer control program of the embodiment of the present invention.

FIG. 2 is a flowchart showing an operation at the installing time of the printer according to the network printer control program of the embodiments of the present invention.

In the drawing, at step S200, the installation of the printer is performed, and the operation proceeds to step S201. What is meant by the installation of the printer in the present embodiment is, for example, a setting up of a driver program for controlling the printer.

At step S201, an IP address is acquired, which is currently set in a PC where the network printer control program being the embodiments of the present invention is in service, and the operation proceeds to step S202.

At step S202, a subnet mask is acquired, which is currently set in the PC where the network printer control program being the embodiments of the present invention is in service, and the operation proceeds to step S203.

At step S203, a network ID of the subnet currently connected to the PC where the network printer control program being the embodiments of the present invention is in service is calculated from the IP address acquired at step S201 and the subnet mask acquired at step S202, and the operation proceeds to step S204. The logical product of the IP address and the subnet mask calculates the network ID.

At step 204, an identifier for attentively identifying the printer installed at step S200 is generated (MAC address and the like of the printer may be utilized), and a list of the network ID of the subnet currently connected to the PC calculated at step S203 is generated and reserved, thereby completing the process.

Figure 3:
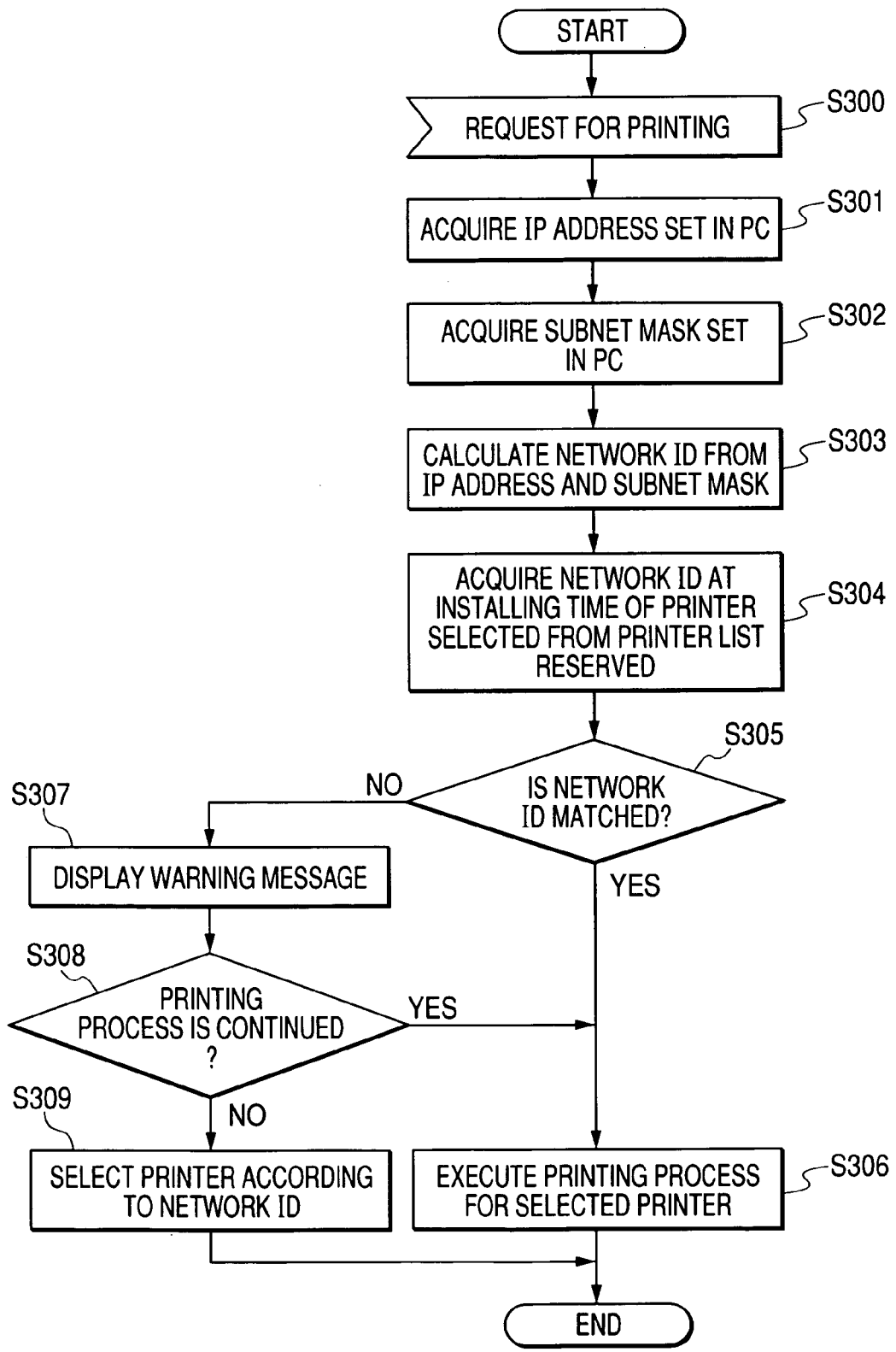
FIG. 3 is a flowchart showing an operation at the printing time by the network printer control program of the embodiment of the present invention.

FIG. 3 is a flowchart showing an operation at the printing time by the network printer control program of the embodiments of the present invention.

In the drawing, at step S300, the user instructs the printing process, and the operation proceeds to step S301.

At step S301, the IP address is acquired, which is currently set in the PC where the network printer control program being currently the embodiments of the present invention is in service, and the operation proceeds to step S302.

At step S302, the subnet mask is acquired, which is currently set in the PC where the network printer control program being the embodiments of the present invention is in service, and the operation proceeds to step S303.

At step S303, the network ID of the subnet currently connected to the PC where the network printer control program being currently the embodiments of the present invention is in service is calculated from the IP address acquired at step S301 and the subnet mask acquired at step S302, and the operation proceeds to step S304.

At step S304, the network ID at the installing time of the printer currently selected is acquired from the identifier of the printer currently selected and the list of the network ID at the installing time of the printer, and the operation proceeds to step S305.

At step S305, a comparison is made between the network ID of the current PC calculated by step S303 and the network ID at the installing time of the selected printer acquired at step S304, and when the network IDs are matched, the operation proceeds to step S306 (step S305: yes), and when not matched, the operation proceeds to step S307 (step S305: No).

At step S306, the currently selected printer executes the printing process, thereby completing the process.

At step S307, when it is determined in step S305 that the network ID of the current PC calculated at step S303 is different from the network ID at the installing time of the selected printer acquired at step S304, a warning message is issued to indicate that the printer currently selected is possibly located at a remote region, and the operation proceeds to step S308.

At step S308, it is determined whether or not the printing process is continued by the printer currently selected by the user, and when the printing process is determined to continue, the operation proceeds to step S306 (step S308: Yes), and when other printer is selected, the operation proceeds to step S309 (step S308: No).

At step S309, when an instruction is issued in step S308 that another printer be selected by the user, a most suitable printer is selected with the network ID as a key by a method to be described later, and the printing process is continued.

Figure 4:
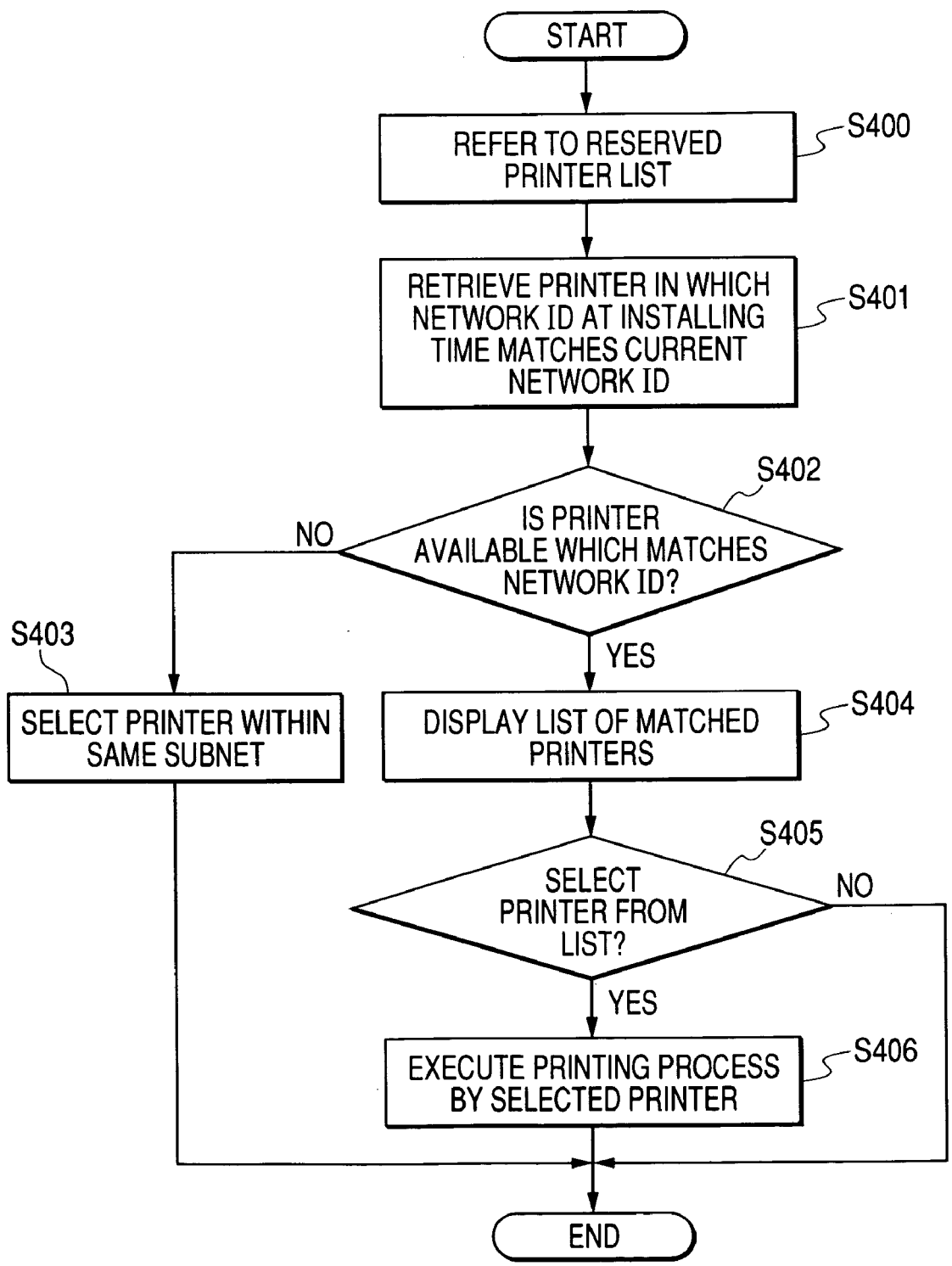
FIG. 4 is a flowchart showing an operation at the selecting time of a most suitable printer by a network ID in the network printer control program of the embodiment of the present invention.

FIG. 4 is a flowchart showing the operation at the selecting time of the suitable printer by the network ID in the network printer control program of the embodiments of the present invention.

In the drawing, at step S400, the identification information on the printer preserved at step S204 of FIG. 2 and the list at the installing time are read, and the operation proceeds to step S401.

At step S401, the printer installed by the subnet having the same network ID as the current network ID of the PC is retrieved from the list read at step S400, and the operation proceeds to step S402.

At step S402, as a result of the retrieval at step S402, it is determined whether or not a printer in which the current network ID of the PC and the network ID at the installing time are matched is detected, and when the printer in which the current network ID of the PC and the network ID at the installing time are matched is detected, the operation proceeds to step S404 (step S402: Yes), and when not detected, the operation proceeds to step S403 (step S402: No).

At step S403, when the printer in which the current network ID of the PC and the network ID at the installing time are matched is not detected in step S402, a sight of printers within the same subnet is prepared by a method to be described later, and an arbitrary printer is selected to continue the printing process.

At step S404, when the printer in which the current network ID of the PC and the network ID at the installing time are matched is detected in step S402, a sight of detected printers is prepared and displayed.

At step S405, a selection of arbitrary printer from a sight of printers displayed at step S404 is performed, and when a printer is selected, the operation proceeds to step S406 (step S405: Yes), and when not selected, the process is completed.

At step S406, in place of the printer requesting for the printing at step S300 of FIG. 3, the printing process is executed by the printer selected at step S405, thereby completing the process.

Figure 5:
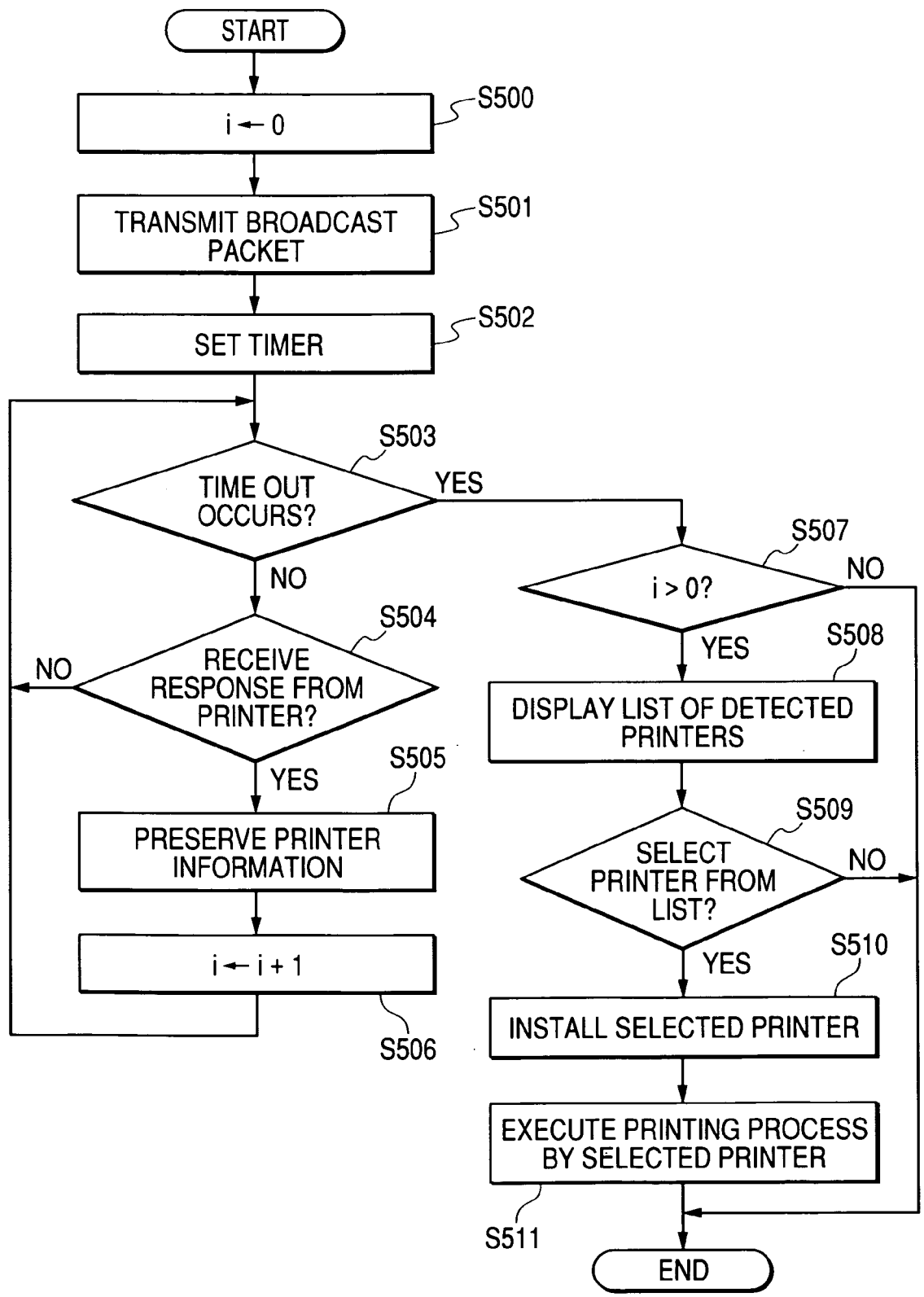
FIG. 5 is a flowchart showing an operation at the selecting time of a printer within the same subnet in the network printer control program according to the embodiment of the present invention.

FIG. 5 is a flowchart showing the operation at the printer selecting time within the same subnet in the network printer control program according to the embodiments of the present invention.

In the drawing, at step S500, a variable i for counting the number of printers within the same detected subnet is initialized, and the operation proceeds to step S501.

At step S501, the printers within the same subnet are retrieved.

To retrieve the printers within the same subnet, for example, an MIB object (printer MIB) supported by the printer is enquired by a broadcast packet within the subnet in conformity to the procedure of an SNMP.

By so doing, the printer, which exists within the same subnet and has the enquired MIB object, sends the enquired information to a broadcast SNMP request, and replies to the effect that no other device has the enquired MIB object.

It is presumed that the network printers within the same subnet are detected by the above described procedure.

At step S502, to monitor a response of the broadcast packet transmitted at step S501, a timer of an appropriate value is set, and the operation proceeds to step S503.

At step S503, it is determined whether or not the timer set at step S502 times out, and when timed out, the operation proceeds to step S507 (step S503: Yes), and when otherwise, the operation proceeds to step S504 (step S503: No).

At step S504, reception of the response of the broadcast packet transmitted at step S501 is performed, and when the response from the printer is received, the operation proceeds to step S505 (step S504: Yes), and when otherwise, the operation returns to step S503 (step S504: No).

At step S505, necessary information is preserved from the response from the printer received at step S504, and the operation proceeds to step S506.

At step S506, the value of a variable i is added with 1, and the operation proceeds to step S503.

At step S507, when a time out occurs at step S503, the reception of the response of the broadcast packet transmitted at step S501 is completed, and the value of the variable i is confirmed. Here, when the value of the variable i is one or more, the operation proceeds to step S508 (step S507: Yes) on assumption that at least one or more printers are detected, and when the value of the variable i is zero, the process is completed (step S507: No).

At step S508, when it is determined that the printers within the same subnet are detected at step S507, a sight of printers connected to the subnet having the same network ID as the current network ID of the PC based on the information preserved at step S505 is displayed, and the operation proceeds to step S509.

At step S509, an arbitrary printer is selected by the user from a sight of printers displayed at step S508, and when a printer is selected, the operation proceeds to step S510 (step S509: Yes), and when otherwise, the process is completed (step S509: No).

At step S510, the installation of the printer selected at step S509 is performed, and the operation proceeds to step S511.

At step S511, the printing process is executed by the printer installed at step S510, thereby completing the process.

Figure 6A:
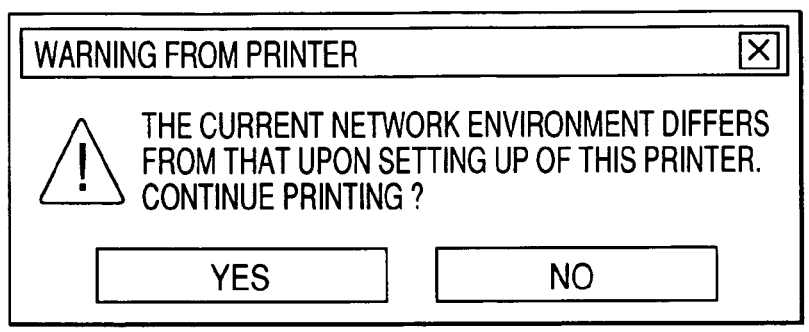
FIG. 6A is an image view showing examples of a warning message in the network printer control program according to the embodiments of the present invention.
Figure 6B:
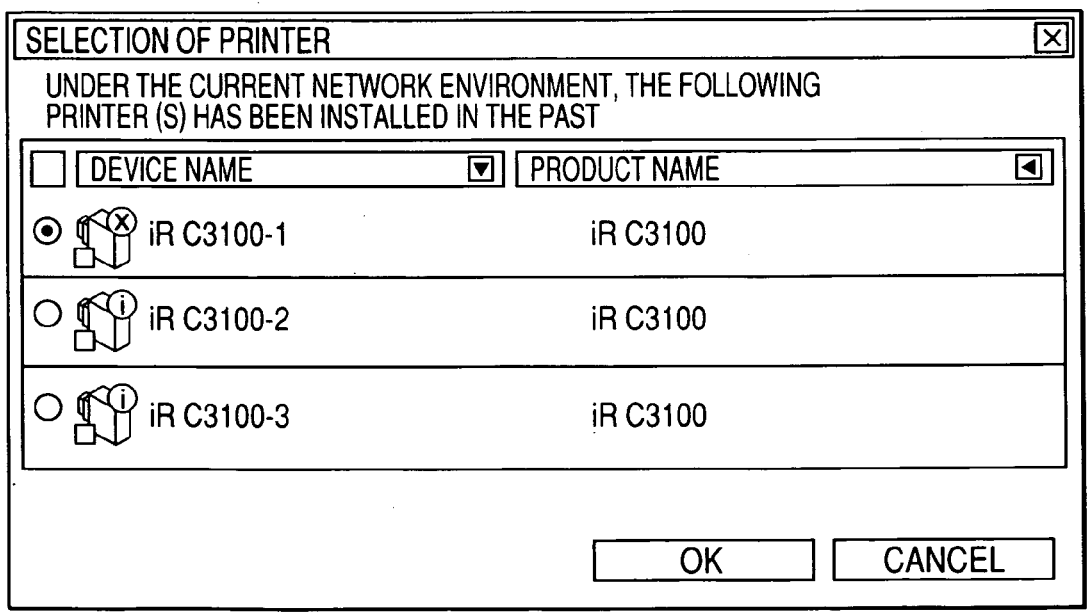
FIG. 6B is a printer selection image in the network printer control program according to the embodiments of the present invention.

FIGS. 6A and 6B show image view showing examples of a warning message a printer selection screen in the network printer control program according to the embodiment of the present invention.

FIG. 6A is an image view showing one example of a warning message displayed when the network ID of the subnet currently connected and the network ID at the installing time of the printer currently selected are different at the executing time of the printing process from the notebook PC 1000.

FIG. 6B is an image view showing one example of a sight of printers in which the network ID of the subnet currently connected with the notebook PC 1000 and the network ID at the installing time are matched.

FIG. 7 is a hardware configuration example of the notebook PC 1000. A bus 701 is connected to a central processing unit (CPU) 702, a ROM 703, a RAM 704, a network interface 705, an input device 706, an output device 707, and an external storage device 708.

The ROM 703 is stored in advance with a control procedure (computer program) of the CPU 702, and this program is executed by the CPU 702, so that the program is activated. The external storage device 708 is stored with the computer program, and the computer program is copied and executed by the RAM 704. The external storage device 708 is, for example, a hard disc storage device, CD-ROM, and the like, and even when the power supply is cut off, the stored content is not erased. The RAM 704 is used as an input and output of data, a work memory for transmission and reception, and a temporary storage for a control of various component elements.

The CPU 702 performs the processing or the calculation of the data by executing the computer program and, at the same time, controls various component elements connected through the bus 701. The notebook PC 1000 has the computer program stored in the external storage device 704 read by the CPU 702, and executed by the CPU 702, thereby performing the processing of FIGS. 2 to 5 and the display of FIGS. 6A and 6B.

Figure 1:
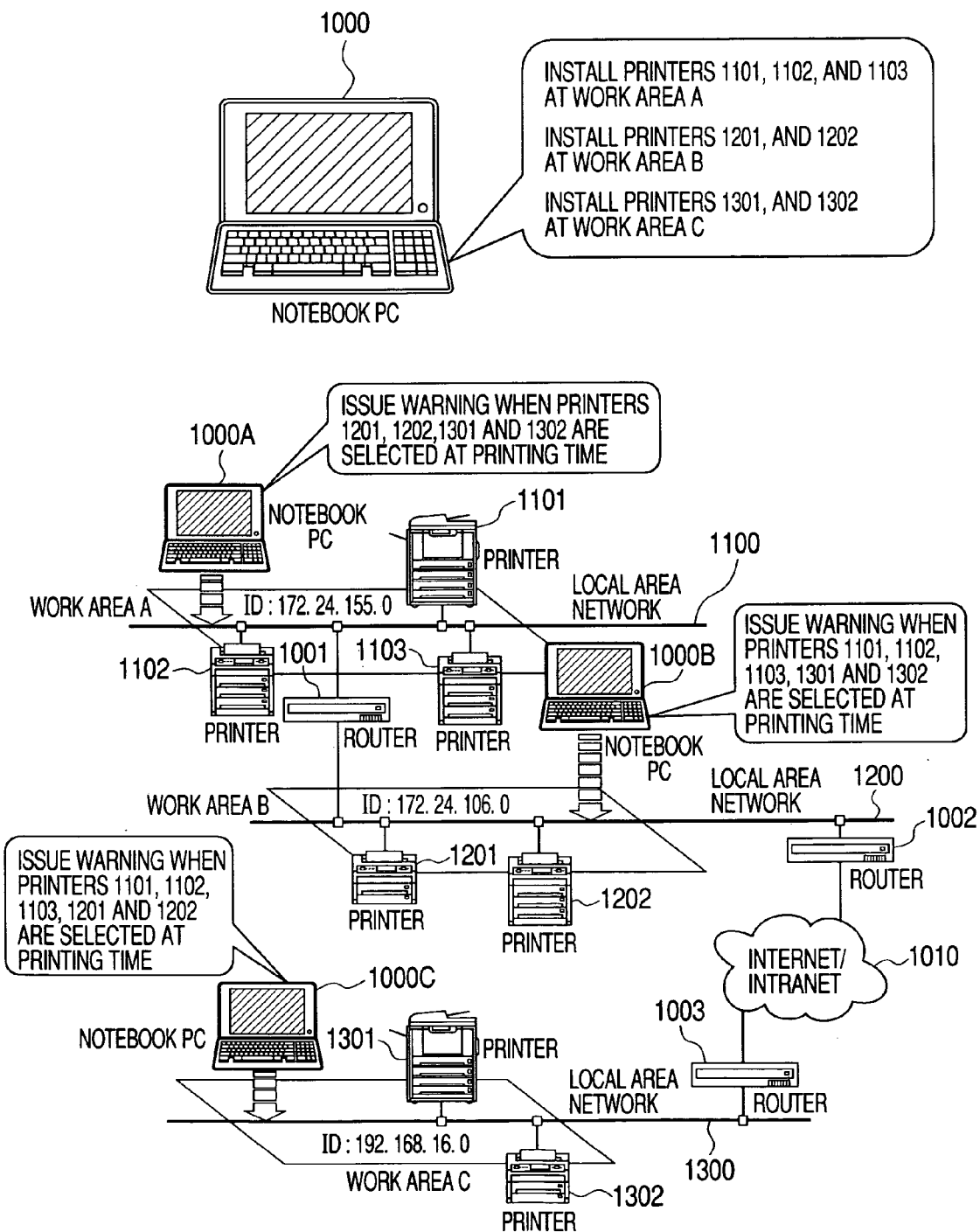
FIG. 1 is a network view showing an operation of a printing process by a network printer control program of embodiment of the present invention.

The network interface 705 is an interface to be connected to the LANs 1100, 1200, 1300, and the like as shown in FIG. 1. The input device 706 is, for example, a keyboard, a mouse, and the like, and can perform various designations, inputs, and the like. The output device 707 is a display, a speaker, and the like, and can display the screen, and the like of FIGS. 6A and 6B.

As described above, according to the present embodiment, as shown in FIG. 2, the Process comprises: an installing step of installing the driver program of the printer connected through the network; a first network group identifier acquiring step for acquiring a group identifier (subnet) of the network according to the installing step or a network group identifier (network ID) based on the installing step;

and a storing step for storing the identifier of the printer and the network group identifier mutually associated.

Further, as shown in FIG. 3, the process comprises: printing request step for requesting printing in a printer connected to the network same as or different from the printer; second network group identifier acquiring step for acquiring a group identifier (subnet) of the network to which the user is connected according to the printing request or a network group identifier (network ID) based on the printing request; and an output step for outputting (displaying) warning information when the network group identifiers acquired by the first and second network group identifier acquiring steps are different.

By so doing, there is an advantage of preventing the computer (PC) from erroneously outputting to the printer installed at a remote region when executing the printing process. Further, taking into consideration that a TCP/IP which is the most widely spread communication protocol sets a subnet for every area that has a physically fixed extent, the output control of the printer which is operated on the computer (PC) and is connected to the network can be performed under the TCP/IP network environment built by the subnet different for every work area. The above-described operation can be adapted to the communication protocol other than the TCP/IP.

Further, as shown in FIG. 4, the process comprises: a detecting step for detecting a printer or a plurality of printers in which the network group identifier stored in association with the installing time from among the printers already installed matches the network group identifier acquired by the second network group identifier acquiring step when the network group identifiers acquired by the first and second network group identifier acquiring steps are different; and a first printing step for changing a printer requested for a printing to one of the detected printers and executing the printing process. In this way, there is an advantage of being able to easily select a most suitable printer.

Further, at this time, the printer which is changed and executes the printing process can be set as a next default printer or a default printer at the time of being connected to the same network group next time. By so doing, at the next printing time, a suitable printer can be set as a default printer. Further, there is an advantage of being able to automatically change a suitable printer for every network group (subnet).

Further, as shown in FIG. 5, the process comprises: a retrieval step for retrieving a printer connected to a network shown by the network group identifier acquired by the second network group identifier acquiring step when the network group identifiers acquired by the first and second network group identifier acquiring steps are different; and a printing step for changing the printer requested for the printing to one printer from among the retrieved printers and installing the driver program and executing the printing process. By so doing, there is an advantage of being able to easily install a suitable printer.

The present embodiment can be realized by executing the program by the computer. Further, means for providing the program to the computer, for example, a recording medium readable by a computer such as CD-ROM and the like which records such a program or a transmission media such as an internet and the like which transmits such a program can be adopted as the embodiments of the present invention. Further, a computer program product such as a recording medium and the like recording the above described program and readable by the computer can be also adopted as the embodiments of the present invention. The above described program, the recording medium, the transmission medium and the computer program product are included in the category of the present invention. As the recording medium, for example, a flexible disc, a hard disc, an optical disc, a magnetic optical disc, CD-ROM, a magnetic tape, a non-volatile memory card, ROM, and the like can be used.

As described above, at the installing time of the driver program of the printer, by storing the identifier of the printer and the network group identifier mutually associated, a correspondence relation between the printer and the network group can be recorded. By so doing, it is possible to prevent an erroneous output from being made on a printer installed at a remote network group when a portable PC is used while moving on the network group (work area) and performing the printing process from the network of the destination of relocation.

Any of the above described embodiments only shows specific examples when executing the present invention. It is to be understood, however, that these specific examples are not intended as a definition of the limits of the invention. That is, the present invention can be executed by various embodiments without departing from the spirit of the invention or its main features.

As many apparently widely different embodiments of the present invention can be made without departing from the spirit and scope thereof, it is to be understood that the invention is not limited to the specific embodiments thereof except as defined in the claims.

This application claims priotity from Japanese Patent Application No. 2003-385165 filed Nov. 14, 2003, which is hereby incorporated by reference herein.

What is claimed is:

1. A network printer control method, comprising;
    an installing step for installing a driver program of a printer connected through a network;
    a first network group identifier acquiring step for acquiring a group identifier of said network according to the installation by said installing step or a network group identifier based on said installing step;
    a storing step for storing an identifier of said printer and the network group identifier in association with each other;
    a printing request step for requesting a printer connected through the network, which is the same as or different from said printer of which the driver program is installed, to perform a printing process; and
    a second network group identifier acquiring step for acquiring, in accordance with tire printing request, a group identifier of the network to which the user is connected or a network group identifier based thereon.

2. The network printer control method according to claim 1, further comprising an output step for outputting warning information when the network group identifiers acquired byte first and second network group identifier acquiring steps are different from each other.

3. The network printer control method according to claim 1, wherein said first network group identifier acquiring step comprises:
    a step for acquiring an IP address and a subnet mask set in a user computer; and
    a step for calculating a network ID from the acquired IP address and subnet mask and determining the network ID as the network group identifier.

4. The network printer control method according to claim 3, wherein said second network group identifier acquiring step comprises:
    a step for acquiring the IP address and subnet mask set in the user computer; and a step for calculating the network ID from the acquired IP address and subnet mask and determining the network ID as the network group identifier.

5. The network printer control method according to claim 1, further comprising:
 a detecting step for detecting, from among printers that are already installed, one or more printers whose network group identifiers stored at the time of installation match the network group identifier acquired at the second network group identifier acquiring step if the network group identifiers acquired by the first and second network group identifier acquiring steps are different from each other; and
 a first printing step for changing the printer requested to perform the printing process to one of said detected printers and executing the printing process.

6. The network printer control method according to claim 5, further comprising:
 a display step for displaying a list of said detected printers; and
 a selection step for selecting a printer from the displayed list of printers,
 wherein said first printing step changes the printer to said selected printer and executes the printing process.

7. The network printer control method according to claim 5, further comprising:
 a setting step for setting said printer, which is changed and executes the printing process, as a default printer for the next time.

8. The network printer control method according to claim 7, wherein said setting step sets the printer which is changed and executes the printing process as a default printer for the next time a connection to the same network group is established.

9. The network printer control method according to claim 1, further comprising:
 a retrieval step for retrieving printers connected to a network identified by the network group identifier acquired by the second network group identifier acquiring step if the network group identifiers acquired by the first and second network group identifier acquiring steps are different from each other; and
 a printing step for changing the printer requested to perform the printing process to one of said retrieved printers and executing the printing process.

10. The network printer control method according to claim 9, wherein said printing step installs a driver program of the printer performing said printing process.

11. The network printer control method according to claim 9, further comprising:
 a display step for displaying a list of said retrieved printers; and
 a selection step for selecting a printer from the list of said displayed printers,
 wherein said printing step changes the printer to perform the printing process to said selected printer and executes the printing process.

12. The network printer control method according to claim 9, wherein said retrieval step retrieves the printers by a local broadcast.

13. The network printer control method according to claim 5, farther comprising:
 a retrieval step for retrieving printers connected to the network identified by the network group identifier acquired by said second network group identifier acquiring step if no printer is detected by said detection step; and
 a second printing step for changing the printer requested to perform the printing process to one of said retrieved printers and executing the printing process.

14. A network printer control apparatus, comprising:
 installing means for installing a driver program of a printer connected through a network;
 first network group identifier acquiring means for acquiring a group identifier of said network according to the installation by said installing means or a network group identifier based on said installation by installing means;
 storing means for storing the identifier of said printer and the said network group identifier in association with each other;
 printing request means for requesting a printer connected to the network, which is the same as or different from said printer of which the driver program is installed, to perform a printing process; and
 second network group identifier acquiring means for acquiring, in accordance with the printing request, a group identifier of the network to which the user is connected or a network group identifier based thereon.

15. The network printer control apparatus according to claim 14, further comprising output means for outputting warning information when the network group identifiers acquired by the first and second network group identifier acquiring means are different from each other.

16. The network printer control apparatus according to claim 14, wherein said first network group identifier acquiring means comprises:
 means for acquiring an IP address and a subnet mask set in a user computer; and
 means for calculating a network ID from said acquired IP address and subnet mask and determining the network ID as the network group identifier.

17. The network printer control apparatus according to claim 16, wherein said second network group identifier acquiring means comprises:
 means for acquiring an IP address and a subnet mask set in the user computer; and
 means for calculating the network ID from said acquired IP address and subnet mask and determining the network ID as the network group identifier.

18. The network printer control apparatus according to claim 14, further comprising:
 detecting means for detecting, from among printers that are already installed, one or more whose network group identifiers stored at the time of installation match the network group identifier acquired by the second network group identifier acquiring means if the network group identifiers acquired by the first and second network group identifier acquiring means are different from each other; and
 first printing means for changing the printer requested to perform the printing process to one of said detected printers and executing the printing process.

19. The network printer control apparatus according to claim 18, further comprising:
 display means for displaying a list of said detected printers; and
 selection means for selecting a printer from the list of said displayed printers,
 wherein said first printing means changes the printer to said selected printer and executes the printing process.

20. The network printer control apparatus according to claim 18, further comprising setting means for setting said printer, which is changed and executes the printing process, as a default printer for the next time.

21. The network printer control apparatus according to claim 20, wherein said setting means sets said printer which is changed and executes the printing process as the default printer for the next time a connection to the same network group is established.

22. The network printer control apparatus according to claim 14, further comprising:
retrieval means for retrieving printers connected to a network identified by the network group identifier acquired by the second network group identifier acquiring means if the network group identifiers acquired by the first and second network group identifier acquiring steps are different from each other; and
printing means for changing the printer requested to perform the printing process to one of said retrieved printers and executing the printing process.

23. The network printer control apparatus according to claim 22, wherein said printing means installs a driver program of the printer performing said printing process.

24. The network printer control apparatus according to claim 22, further comprising:
display means for displaying a list of said retrieved printers; and
selection means for selecting a printer from the list of said displayed printers,
wherein said printing means changes the printer to perform the printing process to said selected printer and executes the printing process.

25. The network printer control apparatus according to claim 22, wherein said retrieval means retrieves the printers by a local broadcast.

26. The network printer control apparatus according to claim 18, further comprising;
retrieval means for retrieving printers connected to a network identified by the network group identifier acquired by said second network group identifier acquiring means if no printer is detected by said detecting means; and
second printing means for changing said printer requested to perform the printing to one of said retrieved printers and executing the printing process.

27. A computer-readable medium having a stored computer program for allowing a computer to execute a network printer control method, the computer program comprising:
an installing step for installing a driver program of a printer connected through a network;
a first network group identifier acquiring step for acquiring a group identifier of said network according to said installing step or a network group identifier based on said installing step;
a storing step for storing the identifier of said printer and said network group identifier in association with each other;
a printing request step for requesting a printer connected to the network, which is the same as or different from said printer of which the driver program is installed, to perform a printing process; and
a second network group identifier acquiring step for acquiring, in accordance with the printing request, a group identifier of the network to which the user is connected or a network group identifier based thereon.

* * * * *

UNITED STATES PATENT AND TRADEMARK OFFICE
CERTIFICATE OF CORRECTION

PATENT NO. : 7,206,091 B2  Page 1 of 1
APPLICATION NO. : 10/986008
DATED : April 17, 2007
INVENTOR(S) : Hagiuda It is certified that error appears in the above-identified patent and that said Letters Patent is hereby corrected as shown below:

COLUMN 1:
Line 20, "mails," should read -- mail, --; and
Line 28, "system" should read -- systems --.

COLUMN 6:
Line 62, "Process" should read -- process --.

COLUMN 8:
Line 32 Claim 1, "comprising;" should read -- comprising: --;
Line 47 Claim 1, "tire" should read -- the --; and
Line 53 Claim 2, "byte" should read -- by the --.

COLUMN 11:
Line 33 Claim 26, "comprising;" should read -- comprising: --.

Signed and Sealed this

Eighteenth Day of March, 2008

JON W. DUDAS
*Director of the United States Patent and Trademark Office*